(12) United States Patent
He et al.

(10) Patent No.: US 10,730,275 B2
(45) Date of Patent: Aug. 4, 2020

(54) MEMBRANE MATERIAL LAMINATION DEVICE AND MEMBRANE MATERIAL LAMINATION METHOD USING THE SAME

(71) Applicant: BOE TECHNOLOGY GROUP CO., LTD., Beijing (CN)

(72) Inventors: Zengsheng He, Beijing (CN); Changhai Feng, Beijing (CN); Zhaohui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 334 days.

(21) Appl. No.: 15/796,704

(22) Filed: Oct. 27, 2017

(65) Prior Publication Data
US 2018/0281375 A1   Oct. 4, 2018

(30) Foreign Application Priority Data

Mar. 30, 2017   (CN) .......................... 2017 1 0201743

(51) Int. Cl.
*B32B 41/00*   (2006.01)
*B32B 37/10*   (2006.01)
(Continued)

(52) U.S. Cl.
CPC .............. *B32B 37/10* (2013.01); *B32B 37/14* (2013.01); *B32B 41/00* (2013.01); *B32B 2457/20* (2013.01); *G06T 7/30* (2017.01)

(58) Field of Classification Search
CPC ......... B32B 37/10; B32B 37/14; B32B 41/00; B32B 2457/20; G06T 7/30; G02F 1/1303
(Continued)

(56) References Cited

U.S. PATENT DOCUMENTS 7,435,209 B2   10/2008 Kimura et al.
2009/0314414 A1*   12/2009 Verschuuren .......... B82Y 10/00
156/64
(Continued)

FOREIGN PATENT DOCUMENTS

CN   101835594 A   9/2010
CN   103287050 A   9/2013
(Continued)

OTHER PUBLICATIONS

First Chinese Office Action dated May 23, 2019, received for corresponding Chinese Application No. 201710201743.9.

*Primary Examiner* — Michael N Orlando
*Assistant Examiner* — Joshel Rivera
(74) *Attorney, Agent, or Firm* — Kinney & Lange, P.A.

(57) ABSTRACT

A membrane material lamination device and a membrane material laminating method using the same are provided. The membrane material lamination device includes: two support structures, each support structure includes a support surface, the two support structures is capable of being in either a first state where the support surfaces are located in an identical plane or a second state where the support surfaces are located in different planes; a pressure application mechanism configured to be located at a first position when the two support structures are in the first state to support the membrane material through the support surfaces of the two support structures, and moved to a second position when the two support structures are in the second state to support the membrane material through the pressure application mechanism and a first support structure; a first driving mechanism; and a second driving mechanism.

18 Claims, 4 Drawing Sheets

(51) Int. Cl.
*B32B 37/14* (2006.01)
*G06T 7/30* (2017.01)

(58) Field of Classification Search
USPC .......................... 156/64, 350, 351, 378, 379
See application file for complete search history.

(56) References Cited

U.S. PATENT DOCUMENTS

2010/0193112 A1　8/2010　Bovet et al.
2017/0032511 A1　2/2017　Wang et al.

FOREIGN PATENT DOCUMENTS

| CN | 104696900 A | 6/2015 |
| CN | 204641013 U | 9/2015 |
| JP | 2013095123 A | 5/2013 |

* cited by examiner

MEMBRANE MATERIAL LAMINATION DEVICE AND MEMBRANE MATERIAL LAMINATION METHOD USING THE SAME

CROSS-REFERENCE TO RELATED APPLICATION

The present application claims the priority of Chinese patent application No. 201710201743.9 filed on Mar. 30, 2017, which is incorporated herein by reference in its entirety.

TECHNICAL FIELD

The present disclosure relates to the manufacture of a display device, in particular to a membrane material lamination device and a membrane material laminating method using the same.

BACKGROUND

Figure 1:
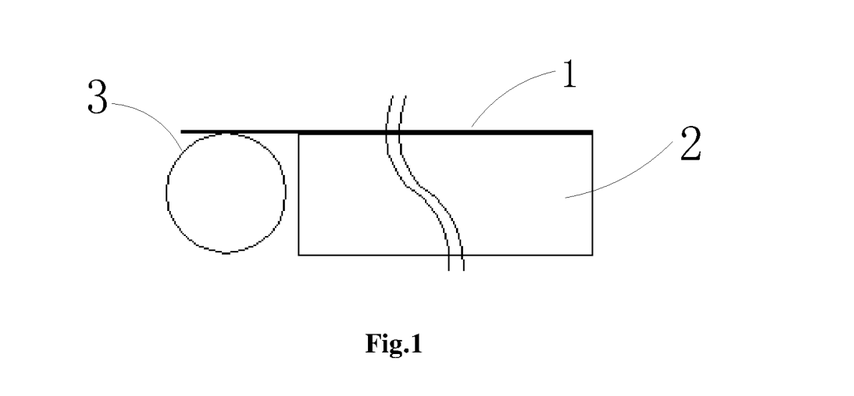
FIG. 1 is a schematic view showing an ideal state of a membrane material lamination device during the lamination in the related art.

During the manufacture of a display device, as an indispensable process, it is necessary to adhere two membrane materials together, e.g., laminate a polarizer onto a panel. Usually, a roller lamination device is used, and FIG. 1 shows the roller lamination device in the related art. Through the roller lamination device, before the lamination, a portion of a to-be-laminated membrane material 1 is placed onto a platform 2, and the other portion of the to-be-laminated membrane material 1 is placed onto a roller 3, i.e., the to-be-laminated membrane material is supported by both the platform 2 and the roller 3. After alignment information has been acquired by a Charge Coupled Device (CCD) functioning as an image collection mechanism above the membrane material 1, another membrane material is placed onto another roller arranged opposite to the roller 3. Then, the two rollers rotate at the same time, so as to adhere the two membrane materials onto each other.

Figure 2:
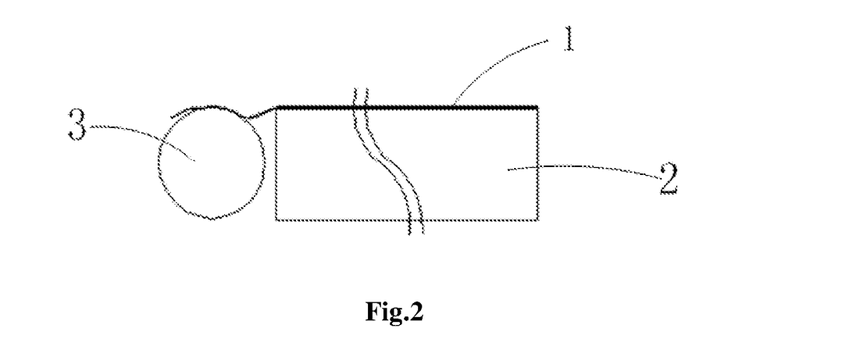
FIG. 2 is a schematic view showing an actual state of the membrane material lamination device during the lamination in the related art.

FIG. 1 shows an ideal state during the membrane material lamination. However, along with the advent of a flexible display device, the membrane materials of the display device become thinner and softer. During the alignment, as shown in FIG. 2, in the case that the portion of the membrane material 1 is placed onto the roller 3, an edge of the membrane material 1 may be curved due to the existence of gravity or any other factors. At this time, it is impossible for the CCD to acquire the alignment information normally, so the lamination cannot be performed normally.

SUMMARY

An object of the present disclosure is to provide a membrane material lamination device and a membrane material laminating method using the same, so as to at least partially solve the problem in the related art where the edge of the membrane material is curved before the lamination during an alignment of the membrane material and thereby it is impossible for the image collection mechanism to acquire the alignment information normally.

In one aspect, the present disclosure provides in some embodiments a membrane material lamination device for laminating a membrane material onto a substrate, including: two support structures, wherein each of the two support structures is provided with a support surface, and the two support structures is capable of being in either a first state or a second state, in the first state, the two support surfaces are located in an identical plane, and in the second state, a second support structure of the two support structures moves relative to a first support structure of the two support structures, to enable that the support surface of the second support structure is located in a plane different from a plane where the support surface of the first support structure is located; a pressure application mechanism for laminating the membrane material onto the substrate, wherein in the case that the two support structures are in the first state, the pressure application mechanism is located at a first position to support the membrane material by the support surfaces of the two support structures, and the first position is away from the membrane material; and in the case that the two support structures are in the second state, the pressure application mechanism is moved to a second position to support the membrane material by the pressure application mechanism and the first support structure; a first driving mechanism connected to at least one of the two support structures, and configured to enable the two support structures to be switched between the first state and the second state; and a second driving mechanism connected to the pressure application mechanism, and configured to enable the pressure application mechanism to move between the first position and the second position.

In a possible embodiment of the present disclosure, in the membrane material lamination device, the first driving mechanism and the second driving mechanism are an identical driving mechanism; and the identical driving mechanism is configured to drive the pressure application mechanism to move from the first position to the second position while driving the two support structures to be switched from the first state to the second state, and configured to drive the two support structures to be switched from the second state to the first state while diving the pressure application mechanism to move from the second position to the first position.

In a possible embodiment of the present disclosure, in the membrane material lamination device, the pressure application mechanism is connected to the second support structure through a connection structure.

In a possible embodiment of the present disclosure, in the membrane material lamination device, the first driving mechanism includes a first electric motor configured to drive the connection structure to rotate through a first rotary shaft, to enable that the support structures and the pressure application mechanism are rotated about the first rotary shaft; and during the rotation, the support structures are switched between the first state and the second state, and the pressure application mechanism is moved between the first position and the second position.

In a possible embodiment of the present disclosure, in the membrane material lamination device, a lateral surface of the first support structure adjacent to the second support structure is an oblique surface.

In a possible embodiment of the present disclosure, in the membrane material lamination device, the pressure application mechanism includes a roller connected to a second electric motor through a second rotary shaft; and in the case that the roller is located at the second position, the second electric motor is configured to drive the roller to rotate through the second rotary shaft, to laminate the membrane material onto the substrate.

In a possible embodiment of the present disclosure, the membrane material lamination device further includes a substrate fixation structure including a bearing surface onto which the substrate is fixed.

In a possible embodiment of the present disclosure, in the membrane material lamination device, the substrate fixation structure is capable of being in either a third state or a fourth state; in the third state, the bearing surface is located in a plane different from a plane where the support surfaces are located, and the bearing surface faces towards a direction identical to that of the support surfaces; and in the fourth state, the bearing surface is arranged opposite to the support surfaces, and the bearing surface and the support surfaces face each other; and the membrane material lamination device further includes a third driving mechanism configured to drive the substrate fixation structure to be switched between the third state and the fourth state.

In a possible embodiment of the present disclosure, in the membrane material lamination device, the third driving mechanism is connected to the substrate fixation structure through a third rotary shaft, and the substrate fixation structure is rotated about the third rotary shaft, to enable the substrate fixation structure to be switched between the third state and the fourth state.

In a possible embodiment of the present disclosure, the membrane material lamination device further includes: an image collection mechanism configured to, after the two support structures are in the first state, the support surfaces of the two support structures support the membrane material and the substrate is fixed onto the substrate fixation structure arranged opposite to the support surfaces, collect alignment information about the membrane material and the substrate.

In a possible embodiment of the present disclosure, in the membrane material lamination device, the support surface of the first support structure and the support surface of the second support structure are each provided with a vacuum adsorption pipeline; and the vacuum adsorption pipelines are configured to, in the first state, vacuum-adsorb the membrane material to enable that the entire membrane material is adhered onto the support surface of the first support structure and the support surface of the second support structure.

In a possible embodiment of the present disclosure, in the membrane material lamination device, the substrate is a glass substrate or a display panel.

In another aspect, the present disclosure provides in some embodiments a membrane material laminating method using the above-mentioned membrane material lamination device, including steps of: applying a first control signal to the first driving mechanism and the second driving mechanism, to enable the two support structures to be in the first state and enable the pressure application mechanism to be at the first position; placing the to-be-laminated membrane material onto the support surfaces of the two support structures, fixing the substrate onto a bearing surface of the substrate fixation structure, and enabling that the bearing surface is located in a plane different from a plane where the support surfaces are located, and the bearing surface faces towards a direction identical to that of the support surfaces; acquiring, by an image collection mechanism, alignment information about the membrane material and the substrate, to perform alignment; applying a second control signal to the first driving mechanism and the second driving mechanism, enable the two support structures to be switched from the first state to the second state, and enable the pressure application mechanism to be moved from the first position to the second position; and enabling the substrate and the membrane material to face each other, and driving the pressure application mechanism to move, to adhere the membrane material onto the substrate.

In a possible embodiment of the present disclosure, in the membrane material laminating method, subsequent to the step of applying the second control signal to the first driving mechanism and the second driving mechanism to enable the two support structures to be switched from the first state to the second state and enable the pressure application mechanism to be moved from the first position to the second position, the membrane material laminating method further includes: driving the substrate fixation structure to rotate, to enable the bearing surface to be arranged opposite to the support surfaces, and enable the bearing surface and the support surfaces to face each other.

In a possible embodiment of the present disclosure, in the membrane material laminating method, subsequent to the step of adhering the membrane material onto the substrate, the membrane material laminating method further includes: applying a third control signal to the first driving mechanism and the second driving mechanism, to enable the support structures to be switched from the second state to the first state, and enable the pressure application mechanism to move from the second position to the first position.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

According to a membrane material lamination device in the embodiments of the present disclosure, prior to adhering a membrane material onto a substrate and in the case of performing alignment, it is able to support the entire membrane material through support surfaces in a plane. As a result, it is able to solve the problem in the related art where an edge of the membrane material is easily cured and thereby an image collection mechanism cannot acquire alignment information normally during the alignment of the membrane material.

Figure 3:
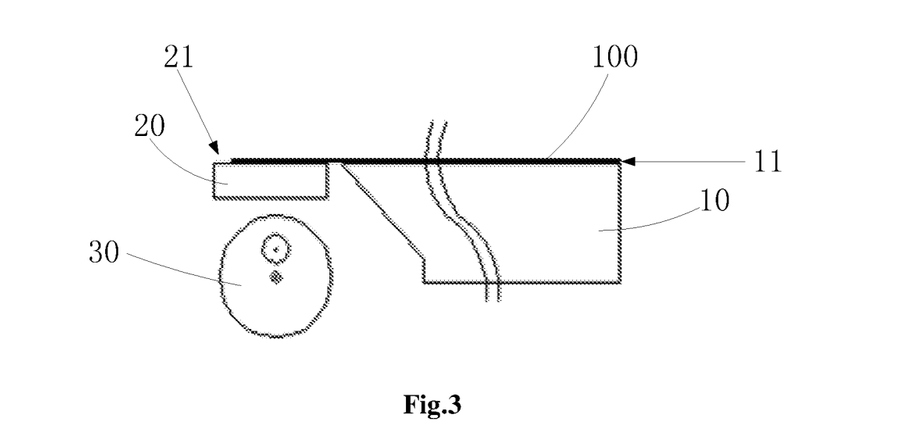
FIG. 3 is a schematic view showing a first use state of a membrane material lamination device according to one embodiment of the present disclosure.
Figure 4:
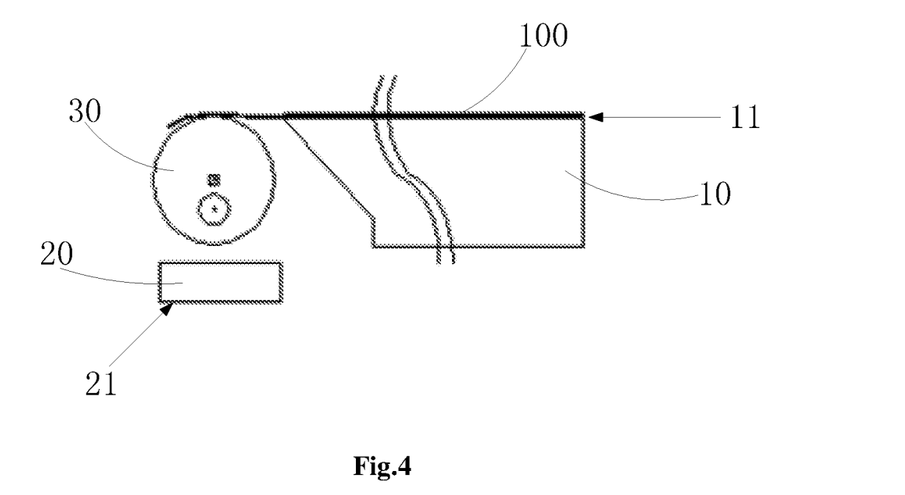
FIG. 4 is a schematic view showing a second use state of the membrane material lamination device according to one embodiment of the present disclosure.

The present disclosure provides in some embodiments a membrane material lamination device which, as shown in FIG. 3 which is a schematic view showing a first use state of the membrane material lamination device and FIG. 4 which is a schematic view showing a second use state of the membrane material lamination device, includes: two support structures, i.e., a first support structure 10 and a second support structure 20, the first support structure 10 being provided with a first support surface 11, the second support structure 20 being provided with a second support surface 21, the two support structures being capable of being switched between a first state where the first support surface 11 and the second support surface 21 are located in an identical plane (as shown in FIG. 3) and a second state where the second support structure 20 moves relative to the first support structure 10 so that the support surface 21 is located in a plane different from the support surface 11 of the first support structure (as shown in FIG. 4); a pressure application mechanism 30 for the lamination of a membrane material onto a substrate, the pressure application mechanism 30 being located at a first position in the case that the two support structures are in the first state (as shown in FIG. 3), so as to support the membrane material 100 through the first support surface 11 and the second support surface 21, the first position being away from the membrane material 100; the pressure application mechanism 30 being moved to a second position in the case that the two support structures are in the second state so as to support the membrane material 100 through the pressure application mechanism 30 and the first support structure 10 (as shown in FIG. 4); a first driving mechanism (not shown) connected to at least one of the support structures and configured to enable the two support structures to be switched between the first state and the second state; and a second driving mechanism (not shown) connected to the pressure application mechanism 30 and configured to enable the pressure application mechanism 30 to move between the first position and the second position.

According to the membrane material lamination device in the embodiments of the present disclosure, the two support structures are capable being separated from each other, and the pressure application mechanism is capable of being moved between the first position and the second position. In this way, in the case of aligning the membrane material with the substrate, the pressure application mechanism is located at the first position away from the membrane material, and the membrane material is supported through the support surface of the first support structure and the support surface of the second support structure, so as to support the entire membrane material in a plane, thereby to prevent an edge of the membrane material from being curved. After the alignment, the second support structure is separated from the first support structure, and the pressure application mechanism is moved to the second position, so as to support the membrane material together with the first support structure, thereby to perform the lamination operation.

Hence, through the two support structures which are capable of being separated from each other and the pressure application mechanism which is capable of being moved between the two positions, it is able to prevent the edge of the membrane material from being curved and thereby to facilitate the lamination operation.

In a possible embodiment of the present disclosure, the support structures and the pressure application mechanism form a linkage structure. To be specific, the first driving mechanism and the second driving mechanism are an identical driving mechanism, which is configured to drive the pressure application mechanism to move from the first position to the second position while driving the two support structures to be switched from the first state to the second state, and configured to drive the two support structures to be switched from the second state to the first state while diving the pressure application mechanism to move from the second position to the first position.

In addition, as shown in FIGS. 3 and 4, the first support structure 10 is arranged fixedly, e.g., installed on a fixed bracket. The second support structure 20 is capable of moving relative to the first support structure 10 and connected to the driving mechanism. Through the driving mechanism, the second support structure 20 is moved, so that the second support surface 21 and the first support surface 11 are located in an identical plane or in different planes.

In a possible embodiment of the present disclosure, in the membrane material lamination device, the pressure application mechanism is connected to the second support structure through a connection structure, so that the pressure application mechanism and the second support structure form a linkage structure and driven by an identical driving mechanism.

Figure 5:
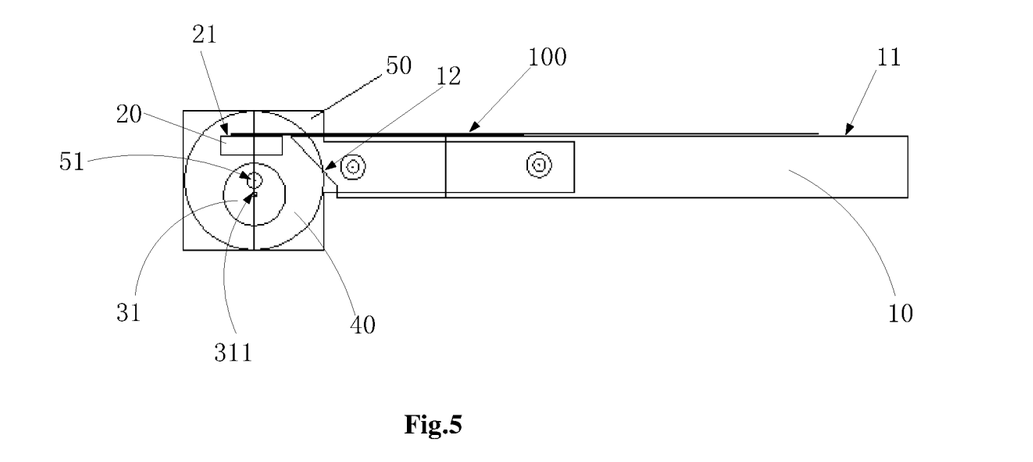
FIG. 5 is a side view of the membrane material lamination device in the first use state according to one embodiment of the present disclosure.
Figure 6:
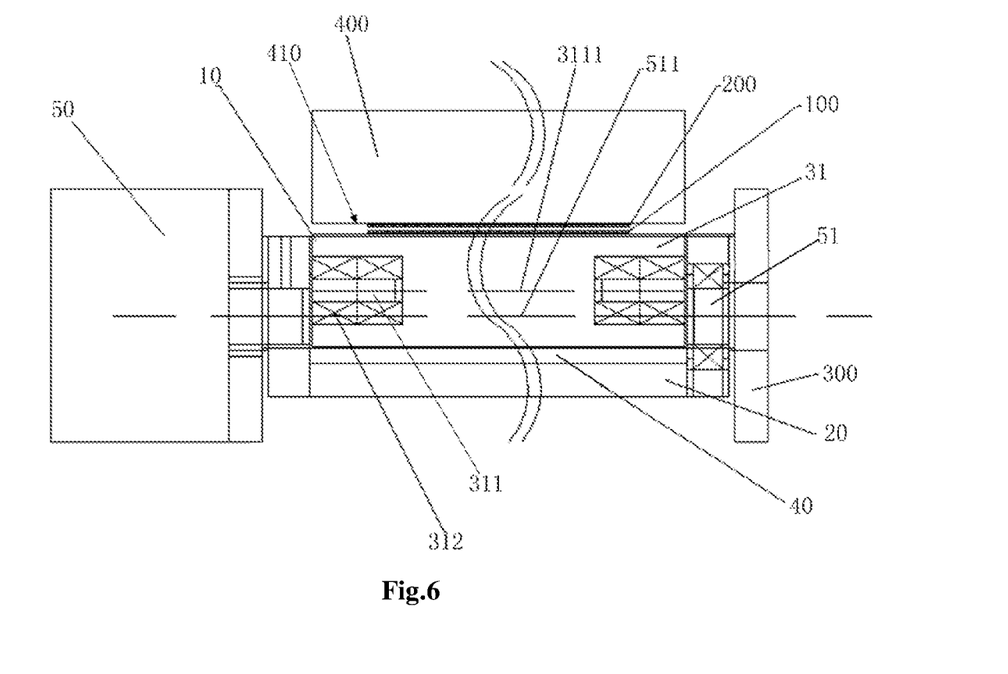
FIG. 6 is a front view of the membrane material lamination device according to one embodiment of the present disclosure.

In a possible embodiment of the present disclosure, as shown in FIG. 5 which is a side view of the membrane material lamination device in a first use state and FIG. 6 which is a front view of the membrane material lamination device in a second use state, the pressure application mechanism 30 includes a roller 31 connected to the second support structure 20 through a connection structure 40, i.e., the second support structure 20 and the roller 31 are both fixedly arranged on the connection structure 40. Further, the connection structure 40 is also connected to the driving mechanism. The driving mechanism includes a first electric motor 50. As shown in FIG. 6, one end of the first rotary shaft 51 is connected to the first electric motor 50, and the other end of the first rotary shaft 51 is fixed onto a frame 300. Through the rotation of the first rotary shaft 51, the second support structure 20 and the pressure application mechanism 30 are driven to rotate simultaneously.

In this way, the second support structure 20 and the pressure application mechanism 30 are rotated about a central axis 511 of the first rotary shaft 51. During the rotation, the second support structure 20 is capable of being switched between the first state and the second state, and the pressure application mechanism 30 is capable of being moved between the first position and the second position.

To be specific, as shown in FIG. 5, in the first state, the roller 31 is located below the second support structure 20 (i.e., at the first position), the second support surface 21 of the second support structure 20 and the first support surface 11 of the first support structure 10 are located in an identical plane, and the entire membrane material 100 is placed on the first support surface 11 and the second support surface 21, so the edge of the membrane material may not be curved. At this time, the membrane material 100 may be aligned with the substrate. After the alignment, as shown in FIG. 5 in conjunction with FIGS. 4 and 6, the first electric motor 50 is started, so as to rotate the first rotary shaft 51, thereby drive the second support structure 20 and the pressure application mechanism 30 to rotate about the central axis 511 of the first rotary shaft 51. At this time, the second support structure 20 is moved relative to the first support structure 10 and rotated downward to the second state. Meanwhile, the roller 31 rotates upward. In the case that the roller 31 has rotated upward to a position of the second support structure 20 as shown in FIG. 5 (i.e., the second position), the roller 31 and the first support structure 10 together support the membrane material 100, as shown in FIG. 6.

In a possible embodiment of the present disclosure, the first support surface 11 and the second support surface 21 are each provided with a vacuum adsorption pipeline configured to, in the first state, vacuum-adsorb the membrane material 100 so that the entire membrane material 100 is adhered onto the first support surface 11 and the second support surface 21. In this way, it is able to firmly fix the membrane material 100 onto the first support surface 11 and the second support surface 21, thereby to further prevent the edge of the membrane material 100 from being curved.

According to the membrane material lamination device in the embodiments, through the connection structure 40 connected to the second support structure 20 and the pressure application mechanism 30 as well as the above-mentioned driving mode, it is able to achieve the linkage between the second support structure 20 and the pressure application mechanism 30, i.e., to enable the pressure application mechanism 30 to be moved between the first position and the second position while switching the second support structure 20 between the first state and the second state.

In a possible embodiment of the present disclosure, as shown in FIG. 5, in order to prevent the rotation of the second support structure 20 and the rotation of the pressure application mechanism 30 from being interfered, a lateral surface 12 of the first support structure 10 adjacent to the second support structure 20 may be an oblique surface.

In a possible embodiment of the present disclosure, the membrane material lamination device further includes an image collection mechanism (not shown) configured to, after the two support structures are in the first state, the support surfaces of the two support structures support the membrane material and the substrate on which the membrane material is to be laminated is fixed onto the substrate fixation structure arranged opposite to the support surfaces, collect alignment information about the membrane material and the substrate.

As shown in FIG. 6, the membrane material lamination device further includes a substrate fixation structure 400 including a bearing surface 410 onto which the substrate 200 is fixed, and the membrane material 100 is to be laminated onto the substrate 200.

Figure 7:
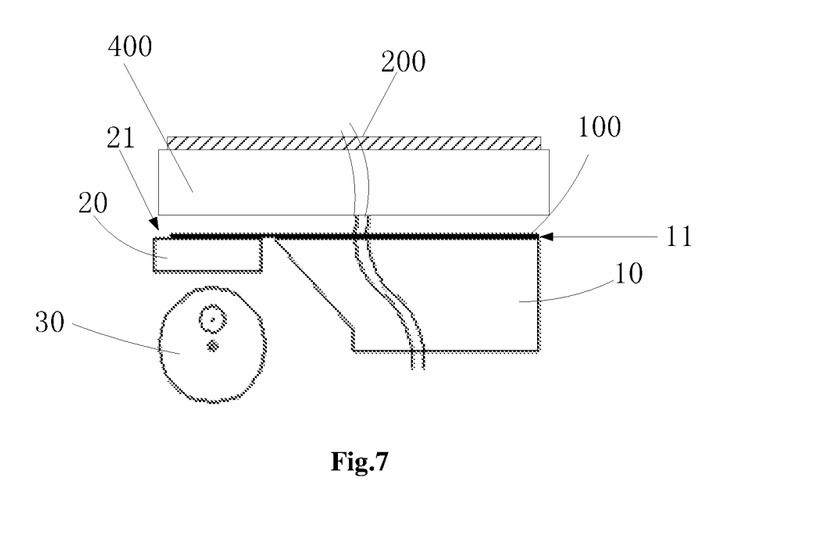
FIG. 7 is a schematic view showing the membrane material lamination device in an alignment state according to one embodiment of the present disclosure.

To be specific, the substrate fixation structure 400 is capable of being switched between a third state (as shown in FIG. 7) where the bearing surface 410 is located in a plane different from, and faces towards a direction identical to, the support surfaces and a fourth state (as shown in FIG. 6) where the bearing surface 410 is arranged opposite to the support surfaces. The membrane material lamination device further includes a third driving mechanism (not shown) configured to drive the substrate fixation structure 400 to be switched between the third state and the fourth state.

As shown in FIG. 7, in the case that the support structures are in the first state, i.e., the second support surface 21 of the second support structure 20 and the first support surface 11 of the first support structure 10 are located in an identical plane, the bearing surface 410 of the substrate fixation structure 400 is located in plane different from, and faces towards a direction identical to, the support surfaces of the two support structures, i.e., the bearing surface 410 and the two support surfaces face upward as shown in FIG. 7.

In this state, under the condition that the entire membrane material 100 is supported by the support surfaces in an identical plane and the edge thereof is not curved, the image collection mechanism may acquire the alignment information about the membrane material 100 and the substrate 200, so as to perform the alignment for the subsequent lamination operation which is prepared for the lamination. After the alignment, the third driving mechanism drives the substrate fixation structure 400 to be switched from the state as shown in FIG. 7 to the state as shown in FIG. 6, i.e., the bearing surface 410 is arranged opposite to the support surfaces. To be specific, the third driving mechanism may be connected to the substrate fixation structure 400 through a rotary shaft. Through the rotation of the substrate fixation structure 400 about the rotary shaft, it is able to switch the substrate fixation structure 400 between the third state and the fourth state.

In the case that the substrate fixation structure 400 is in the fourth state, as shown in FIGS. 5 and 6, the first electric motor 50 is started, so as to rotate the first rotary shaft 51, thereby to drive the second support structure 20 to be switched from the second state to the first state. Meanwhile, the roller 31 is rotated from the first position to the second position, i.e., the membrane material 100 is supported by the roller 31 and the first support structure 10 simultaneously rather than by the first support structure 10 and the second support structure 20, so as to facilitate the subsequent lamination operation.

In the embodiments of the present disclosure, the roller 31 is connected to a second electric motor (not shown) through a second rotary shaft 311. In the case that the roller 31 is located at the second position, the second electric motor drives the roller 13 to rotate about a central axis 3111 of the second rotary shaft 311. In addition, it should be appreciated that, the membrane material lamination device further includes a fourth driving mechanism configured to drive the roller 31 and the first support structure 10 to move together. In the case that the roller 31 is located at the second position, the fourth driving mechanism drives the roller 31 and the first support structure 10 to move towards the substrate 200, so as to provide a predetermined gap between the membrane material 100 and the substrate 200. At this time, because the membrane material 100 is arranged on the roller 31, it is able to apply a pressure upward to the membrane material 100 through the rotation of the roller 31, so as to enable the membrane material 100 to be adhered onto the substrate 200. Of course, in order to facilitate the lamination of the membrane material 100 and the substrate 200, before the lamination, the predetermined gap needs to be provided therebetween. A person skilled in the art shall know a value of the predetermined gap, which is not a focus of the present disclosure and thus will not be particularly defined herein.

In addition, it should be appreciated that, as shown in FIG. 6, the roller 31 is connected to the second rotary shaft 311 through a bearing 312. It should be appreciated that, a connection mode where the second electric motor is connected to the roller 31 through the second rotary shaft 311 is known in the art and thus will not be particularly defined herein.

In the embodiments of the present disclosure, the substrate 200 may be a membrane-like or plate-like piece made of any material, e.g., it may be a glass substrate or a display panel.

According to the membrane material lamination device in the embodiments of the present disclosure, the two support structures are capable of being separated from each other and the pressure application mechanism is capable of being moved between the two positions. As a result, it is able to prevent the edge of the membrane material from being curved during the alignment, thereby to facilitate the subsequent lamination operation.

Figure 8:
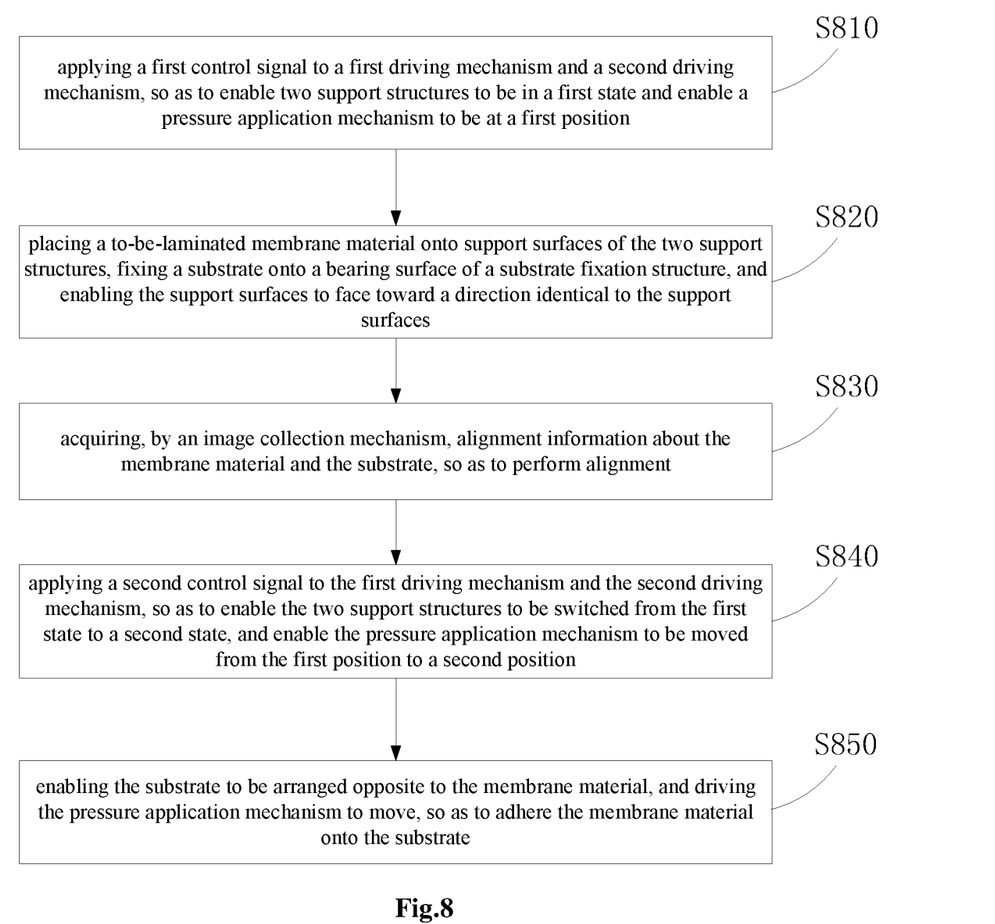
FIG. 8 is a flow chart of a membrane material laminating method according to one embodiment of the present disclosure.

The present disclosure further provides in some embodiments a membrane material laminating method using the above-mentioned membrane material lamination device which, as shown in FIG. 8, includes the following steps.

Step S810 of applying a first control signal to the first driving mechanism and the second driving mechanism, so as to enable the two support structures to be in the first state and enable the pressure application mechanism to be at the first position, as shown in FIG. 7, i.e., enable the support surfaces of the first support structure 10 and the second support structure 20 to be located in an identical plane and enable the pressure application mechanism 30 to be located below the second support structure 20.

Step S820 of placing the to-be-laminated membrane material 100 onto the support surfaces of the two support structures, fixing the substrate 200 onto the bearing surface 410 of the substrate fixation structure 400, and enabling the support surfaces to be in a plane different from, and face towards a direction identical to, the support surfaces, as shown in FIG. 7.

Step S830 of acquiring, by the image collection mechanism, alignment information about the membrane material and the substrate, so as to perform alignment.

Step S840 of applying a second control signal to the first driving mechanism and the second driving mechanism, so as to enable the two support structures to be switched from the first state to the second state, and enable the pressure application mechanism to be moved from the first position to the second position, as shown in FIGS. 6 and 4, i.e., enable the support surfaces of the first support structure 10 and the second support structure 20 to be located in different planes, and enable the pressure application mechanism 30 and the first support structure 10 to support the membrane material 100.

Step S850 of enabling the substrate 200 to be arranged opposite to the membrane material 100, and driving the pressure application mechanism to move, so as to adhere the membrane material onto the substrate, as shown in FIG. 6.

In addition, subsequent to S840, the membrane material laminating method further includes driving the substrate fixation structure to rotate, so as to enable the bearing surface to be arranged opposite to the support surfaces, such that the substrate on the bearing surface is arranged opposite to the membrane material on the supporting surfaces.

Subsequent to Step S850, the membrane material laminating method further includes: applying a third control signal to the first driving mechanism and the second driving mechanism, so as to enable the support structures to be switched from the second state to the first state, and enable the pressure application mechanism to move from the second position to the first position.

Through the above-mentioned steps, the support structures may be returned to the first state, and the pressure application mechanism may be moved back to the first position, so as to facilitate a next lamination operation.

According to the membrane material laminating method in the embodiments of the present disclosure, before the image collection mechanism has acquired the alignment information about the membrane material and the substrate, the support surfaces of the first support structure 10 and the second support structure 20 are located in an identical plane and the entire membrane material is supported by the support surfaces in an identical plane. As a result, it is able to prevent the edge of the membrane material from being curved, thereby to ensure the accurate alignment.

According to the membrane material lamination device and the membrane material laminating method in the embodiments of the present disclosure, the two support structures are capable of being separated from each other and the pressure application mechanism is capable of being moved between the two positions, so it is able to support the entire membrane material through the support surfaces in an identical plane before the lamination operation and during the alignment. As a result, it is able to prevent the edge of the membrane material from being easily curved during the alignment, thereby to enable the image collection mechanism to acquire the alignment information normally.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A membrane material lamination device for laminating a membrane material onto a substrate, comprising:
   two support structures, wherein each of the two support structures is provided with a support surface, and the two support structures are capable of being in either a first state or a second state; wherein in the first state, the two support surfaces are located in an identical plane; and in the second state, a second support structure of the two support structures moves relative to a first support structure of the two support structures, to enable the support surface of the second support structure to be located in a plane different from a plane where the support surface of the first support structure is located;
   a pressure application mechanism for laminating the membrane material onto the substrate, configured such that when the two support structures are in the first state, the pressure application mechanism is located at a first position to support the membrane material by the support surfaces of the two support structures, and the first position is away from the membrane material, and when the two support structures are in the second state, the pressure application mechanism is moved to a second position to support the membrane material by the pressure application mechanism and the first support structure;
a first driving mechanism connected to at least one of the two support structures, and configured to enable the two support structures to be switched between the first state and the second state; and
a second driving mechanism connected to the pressure application mechanism, and configured to enable the pressure application mechanism to move between the first position and the second position;
wherein the first driving mechanism and the second driving mechanism are an identical driving mechanism; and
wherein the identical driving mechanism is configured to drive the pressure application mechanism to move from the first position to the second position while driving the two support structures to be switched from the first state to the second state, and is configured to drive the two support structures to be switched from the second state to the first state while diving the pressure application mechanism to move from the second position to the first position.

2. The membrane material lamination device according to claim 1, wherein:
the pressure application mechanism is connected to the second support structure through a connection structure.

3. The membrane material lamination device according to claim 2, wherein:
the first driving mechanism comprises a first electric motor configured to drive the connection structure to rotate through a first rotary shaft, to enable the support structures and the pressure application mechanism to rotate about the first rotary shaft; and
during the rotation, the support structures are switched between the first state and the second state, and the pressure application mechanism is moved between the first position and the second position.

4. The membrane material lamination device according to claim 2, wherein:
a lateral surface of the first support structure adjacent to the second support structure is an oblique surface.

5. A membrane material lamination device for laminating a membrane material onto a substrate, comprising:
two support structures, wherein each of the two support structures is provided with a support surface, and the two support structures are capable of being in either a first state or a second state; wherein in the first state, the two support surfaces are located in an identical plane; and in the second state, a second support structure of the two support structures moves relative to a first support structure of the two support structures, to enable the support surface of the second support structure to be located in a plane different from a plane where the support surface of the first support structure is located;
a pressure application mechanism for laminating the membrane material onto the substrate, configured such that when the two support structures are in the first state, the pressure application mechanism is located at a first position to support the membrane material by the support surfaces of the two support structures, and the first position is away from the membrane material, and when the two support structures are in the second state, the pressure application mechanism is moved to a second position to support the membrane material by the pressure application mechanism and the first support structure;
a first driving mechanism connected to at least one of the two support structures, and configured to enable the two support structures to be switched between the first state and the second state; and
a second driving mechanism connected to the pressure application mechanism, and configured to enable the pressure application mechanism to move between the first position and the second position,
wherein:
the pressure application mechanism comprises a roller connected to a second electric motor through a second rotary shaft; and
the second electric motor is configured to, when the roller is located at the second position, drive the roller to rotate through the second rotary shaft, to laminate the membrane material onto the substrate.

6. The membrane material lamination device according to claim 1, further comprising:
a substrate fixation structure comprising a bearing surface onto which the substrate is fixed.

7. A membrane material lamination device for laminating a membrane material onto a substrate, comprising:
two support structures, wherein each of the two support structures is provided with a support surface, and the two support structures are capable of being in either a first state or a second state; wherein in the first state, the two support surfaces are located in an identical plane; and in the second state, a second support structure of the two support structures moves relative to a first support structure of the two support structures, to enable the support surface of the second support structure to be located in a plane different from a plane where the support surface of the first support structure is located;
a pressure application mechanism for laminating the membrane material onto the substrate, configured such that when the two support structures are in the first state, the pressure application mechanism is located at a first position to support the membrane material by the support surfaces of the two support structures, and the first position is away from the membrane material, and when the two support structures are in the second state, the pressure application mechanism is moved to a second position to support the membrane material by the pressure application mechanism and the first support structure;
a first driving mechanism connected to at least one of the two support structures, and configured to enable the two support structures to be switched between the first state and the second state;
a second driving mechanism connected to the pressure application mechanism, and configured to enable the pressure application mechanism to move between the first position and the second position; and
a substrate fixation structure comprising a bearing surface onto which the substrate is fixed,
wherein:
the substrate fixation structure is capable of being in either a third state or a fourth state; wherein in the third state, the bearing surface is located in a plane different from a plane where the support surfaces are located, and the bearing surface faces towards a direction identical to that of the support surfaces, and in the fourth state, the bearing surface is arranged opposite to the support surfaces, and the bearing surface and the support surfaces face each other; and the membrane material lamination device further comprises a third driving mechanism configured to drive the substrate fixation structure to be switched between the third state and the fourth state.

8. The membrane material lamination device according to claim 7, wherein:

the third driving mechanism is connected to the substrate fixation structure through a third rotary shaft, and the substrate fixation structure is rotated about the third rotary shaft, to enable the substrate fixation structure to be switched between the third state and the fourth state.

9. The membrane material lamination device according to claim 1, further comprising:

an image collection mechanism configured to, when the two support structures are in the first state, after the support surfaces of the two support structures support the membrane material and the substrate is fixed onto a substrate fixation structure arranged opposite to the support surfaces, collect alignment information about the membrane material and the substrate.

10. The membrane material lamination device according to claim 1, wherein:

the support surface of the first support structure and the support surface of the second support structure are each provided with a vacuum adsorption pipeline; and the vacuum adsorption pipelines are configured to, in the first state, vacuum-adsorb the membrane material to enable the entire membrane material to be adhered onto the support surface of the first support structure and the support surface of the second support structure.

11. A membrane material laminating method using the membrane material lamination device according to claim 1, comprising:

applying a first control signal to the first driving mechanism and the second driving mechanism, to enable the two support structures to be in the first state and enable the pressure application mechanism to be at the first position;

placing the membrane material to be laminated onto the support surfaces of the two support structures, fixing the substrate onto a bearing surface of a substrate fixation structure, and locating the bearing surface in a plane different from a plane where the support surfaces are located, the bearing surface facing towards a direction identical to that of the support surfaces;

acquiring, by an image collection mechanism, alignment information about the membrane material and the substrate, to perform alignment;

applying a second control signal to the first driving mechanism and the second driving mechanism, to enable the two support structures to be switched from the first state to the second state, and enable the pressure application mechanism to be moved from the first position to the second position; and enabling the substrate and the membrane material to face each other, and driving the pressure application mechanism to move, to adhere the membrane material onto the substrate.

12. The membrane material laminating method according to claim 11, wherein subsequent to the step of applying the second control signal to the first driving mechanism and the second driving mechanism to enable the two support structures to be switched from the first state to the second state and enable the pressure application mechanism to be moved from the first position to the second position, the membrane material laminating method further comprises:

driving the substrate fixation structure to rotate, to enable the bearing surface to be arranged opposite to the support surfaces, and enable the bearing surface and the support surfaces to face each other.

13. The membrane material laminating method according to claim 11, wherein subsequent to the step of adhering the membrane material onto the substrate, the membrane material laminating method further comprises:

applying a third control signal to the first driving mechanism and the second driving mechanism, to enable the support structures to be switched from the second state to the first state, and enable the pressure application mechanism to move from the second position to the first position.

14. The membrane material laminating method according to claim 11, wherein:

the first driving mechanism and the second driving mechanism are an identical driving mechanism; and the identical driving mechanism is configured to drive the pressure application mechanism to move from the first position to the second position while driving the two support structures to be switched from the first state to the second state, and is configured to drive the two support structures to be switched from the second state to the first state while diving the pressure application mechanism to move from the second position to the first position.

15. The membrane material laminating method according to claim 14, wherein:

the pressure application mechanism is connected to the second support structure through a connection structure.

16. The membrane material laminating method according to claim 15, wherein:

the first driving mechanism comprises a first electric motor configured to drive the connection structure to rotate through a first rotary shaft, to enable the support structures and the pressure application mechanism to rotate about the first rotary shaft; and during the rotation, the support structures are switched between the first state and the second state, and the pressure application mechanism is moved between the first position and the second position.

17. The membrane material laminating method according to claim 15, wherein:

a lateral surface of the first support structure adjacent to the second support structure is an oblique surface.

18. The membrane material laminating method according to claim 11, wherein:

the pressure application mechanism comprises a roller connected to a second electric motor through a second rotary shaft; and the second electric motor is configured to, when the roller is located at the second position, drive the roller to rotate through the second rotary shaft, to laminate the membrane material onto the substrate.

\* \* \* \* \*